United States Patent Office 3,435,027
Patented Mar. 25, 1969

---

3,435,027
CELLULOSE ETHER-ESTERS AND PROCESS
Armand J. Desmarais and Albert R. Reid, Wilmington, Del., assignors to Hercules Incorporated, a corporation of Delaware
No Drawing. Filed Dec. 13, 1965, Ser. No. 513,562
Int. Cl. C08b 13/00, 21/34
U.S. Cl. 260—226                                   4 Claims

ABSTRACT OF THE DISCLOSURE

Water-soluble ether-esters of cellulose and process of preparing comprising acylating a water soluble cellulose ether in the presence of a nonsolvent reaction medium to an acyl content of about 0.1%–18%.

---

The present invention relates to cellulose ether-esters having improved properties and process of preparing. More particularly, the present invention relates to the partial esterification of water soluble cellulose ethers to produce water soluble ether-esters of cellulose having improved properties.

For the sake of brevity the following designations will be used sometimes hereinafter: CMC is carboxymethylcellulose, CMHEC is carboxymethyl hydroxyethyl cellulose, HEC is hydroxyethyl cellulose, HPC is hydroxypropyl cellulose, MC is methyl cellulose, and MHPC is methyl hydroxypropyl cellulose.

This invention provides a means of partially esterifying water soluble cellulose ethers without substantially changing their viscosity properties to give water soluble ether-esters of cellulose being substantially improved in one or more of the properties of dispersibility, dissolving rate, interfacial activity, and foam stability.

Water-soluble, natural and synthetic gums (including certain cellulose ethers) have attained wide-spread use in a large number of commercial applications. In general, such gums are dissloved in water prior to or at the time of use. Even though the gums are water soluble, long periods of time are often required to dissolve the gums in water. This is a serious drawback in applications where rapid and ease of solution with a minimum amount of agitation is necessary or desirable. The water solubility of such gums is dependent on both the time required to disperse the particles in water and the time required for the dispersed particles to go into solution. Therefore, in order to improve the water solubility of such gums either the time required to disperse the particles in water or the time required for the particles to go into solution after being dispersed must be reduced.

The problem does not lie in the time required for the dispersed gum particles to go into solution because such individual particles hydrate and swell to form solutions rapidly unless hindered by agglomeration. The difficulty is the undesirably long time required to disperse the particles. The numerous individual particles tend to agglomerate when the gum is mixed with water. Rapid hydration takes place over the surface of such agglomerated aggregates to form gel-coated lumps, the interiors of which are still substantially dry, and these lumps are then extremely difficult to disperse. This effect is aggravated by the fact that some gums have a tendency to float on the surface of the water, allowing partially dissolved particles to agglomerate into large lumps or masses. This phenomenon is quite general and has been observed with various of the water-soluble gums in commercial use. In order to break up such lumps or masses and facilitate rapid dispersion and thus solution of the gums, it is necessary to employ costly and powerful mixing equipment capable of developing high shear. Thus, the problem of increasing the dispersion rate of water-soluble gums is largely one of reducing the tendency to form large gel masses and thereby enhancing dispersion of the individual particles of gum through the water to allow rapid hydration and solution of the individual particles without resort to costly and powerful agitation equipment or other time consuming measures.

The improvements mentioned hereinbefore which are realized by carrying out the present invention result from the introduction of acyl groups within the polymer molecules, varying the hydrophobic/hydrophilic ratio without substantially changing the water solubility of the cellulose ethers. The addition of acyl groups according to this invention increases the hydrophobic character of the cellulose ethers leading to:

(1) Delayed hydration which is very pronounced for extremely hydrophilic cellulose ethers (e.g. CMC, HEC, CMHEC, MC, MHPC) which normally lump badly on mixing with water. No appreciable improvement is detectable by acylation of water soluble cellulose ethers which normally disperse well in water, e.g. HPC.

(2) Increased interfacial activity whereby the interfacial tension of cellulose ethers in multi-phase systems (e.g. oil-water or air-water systems) is substantially lowered, resulting in improved emulsifying action and/or foam stability.

(3) Decreased capacity to retain water at elevated temperatures (i.e. lowering the opaque temperatures). This phenomenon which is reversible is not applicable to extremely hydrophilic cellulose ethers (e.g. CMC, CMHEC, HEC), but is applicable to the more hydrophobic water soluble cellulose ethers having opaque temperatures (e.g. HPC and MC).

The cellulose ether-esters of the present invention with improved disperibility can be utilized in applications now existing for the poorly dispersed cellulose ethers (e.g. thickeners, protective colloids, sizes, paper additives, etc.). Uses for those cellulose ether-esters hereof which can serve as foam stabilizers and/or emulsifier-thickeners or for ether-esters having lowered opaque temperatures include e.g. refrigerated aerosols, aerated frostings, beer foam stabilizers, salad dressings (e.g. French dressing), flavor emulsions, foam-mat drying, and warp size.

The following examples illustrate various embodiments of the present invention. These examples are not intended to restrict the scope of the invention beyond that of the appended claims. In these examples and elsewhere herein, the concentrations of aqueous media are given in percent by volume thereof, and all other percentages by weight. All viscosities herein were measured with a standard Brookfield Synchro-Lectric LVF viscometer on aqueous solutions at 25° C. of the concentrations specified. In these examples the cellulose ether was acylated with or without an acylating catalyst in the presence of a nonsolvent reaction medium at room temperature (about 25° C.) while stirring. The nonsolvent was either the acylating agent or an inert reaction medium. Agitation was employed throughout mixing of the various materials and throughout the acylation. After acylation the reaction mixture was washed and steeped to purify and then dried at 65° C. in vacuo.

The acyl content in the following examples was determined by saponification of a water solution of the acylated product. A one gram sample was dissolved in 100 ml. distilled $H_2O$ in a 250 ml. Erlenmeyer flask using a magnetic stirring bar, 25.0 ml. of 0.1 N NaOH (aqueous) was added, and the flask flushed with nitrogen, and stoppered. The saponification was allowed to proceed for 48 hours, an excess of 0.1 N HCl was added (phenolphthalein end point), the solution was stirred to insure complete neutralization of the excess base, and then the excess acid was titrated with 0.1 N NaOH. From this the percent acyl was calculated.

In order to evaluate the effectiveness of this invention on improvement of dispersibility and dissolving time of the cellulose ethers acylated, the carefully standardized dispersion and solution test hereinafter described was used. A 12-ounce clear glass bottle was placed in a cyclic inverting machine. The machine was set to invert the bottle 5 couplete cycles in 12 seconds. Two hundred ml. of distilled water at 25° C. was placed in the bottle. One gram of the sample to be tested was added to the water in the bottle. The machine was immediately started and the bottle was inverted 5 times in the set time limit. Each test was run in duplicate and interpreted as follows.

Poor dispersibility—if both runs had lumps or gels with centers of unwetted material.
Fair dispersibility—if one run lumped and the other did not or if both had fairly large but completely wetted gels.
Good dispersibility—if both runs were free of lumps and large gels.
Excellent dispersibility—if both runs were free of lumps and gels.

The opaque temperature was obtained by raising the temperature of a 0.1% aqueous solution of the sample at a rate of 1.5° C.–2° C. per minute. This was done in a test tube in which a thermometer was immersed. The lowest temperature at which the solution became opaque was recorded as the opaque temperature.

The interfacial tension was measured by the Du Nouy tensiometer which is a well known instrument.

Further details regarding the preparation and properties of the products are given in the following and in Tables 1–4 hereinafter.

Example 2 (Example 1 control) CMC and acetic anhydride 55 grams CMC was slurried in 500 ml. 70% acetone containing 1.5 grams sodium hydroxide catalyst. Then 3.75 grams acetic anhydride was added and the reaction allowed to run 5 minutes. The product was washed thoroughly and steeped in order to purify and then dried.

The product had 1.2% acetyl content. It had good dispersibility whereas the control had poor dispersibility. Dissolving times for the product were 33 minutes with mild stirring and 3 minutes with high speed stirring. Corresponding dissolving times for the control were greater than 62 minutes and 20 minutes, respectively.

Example 3 (Example 1 control) CMC and acetic anhydride

Example 2 was substantially repeated except less acetic anhydride was used, and the reaction time was longer in 85% acetone.

The product had 0.6% acetyl content. It had good dispersibility and dissolved in 2 minutes whereas the control had poor dispersibility and required 20 minutes to dissolve.

Example 4 (Example 1 control) CMC and acetic anhydride

Example 2 was substantially repeated except the reaction time was increased from 5 to 30 minutes.

The product had a 0.9% acetyl content. It required 120 hours to dissolve whereas the control dissolved in only 20 minutes. The product had excellent dispersibility whereas the control had poor dispersibility.

Example 5 (Example 1 control) CMC and lactic anhydride 5.5 grams CMC was slurried in 40 ml. 70% acetone containing 0.1 gram sodium hydroxide catalyst. To this slurry was added 10 ml. 70% acetone containing 0.35 gram lactic anhydride and the reaction allowed to proceed 5 minutes. Then the product was washed, steeped and dried.

The product had a 0.2% lactyl content. It had substantially better dispersibility and faster dissolving rate than the control.

Example 6 (Example 1 control) CMC and stearic anhydride 5.5 grams CMC was slurried in 59 ml. acetone to which was added 6 ml. water containing 0.03 gram sodium hydroxide catalyst dissolved therein. Then 15 ml. chloroform containing 0.38 gram stearic anhydride was added and the reaction allowed to proceed 5 minutes. The product was washed, steeped and dried.

The product had a 1.2% stearyl content. It had substantially better dispersibility and faster dissolving rate than the control.

Example 8 (Example 7 control) CMC and propionic anhydride

Example 7 control had a considerably lower viscosity than Example 1 control.

55 grams CMC was slurried in 500 ml. 80% isopropyl alcohol (IPA) containing 1.5 grams sodium hydroxide catalyst dissolved therein. Then 3.75 grams propionic anhydride was added and the reaction allowed to proceed 10 minutes. The product was washed, steeped and dried.

The product had a 0.2% propionyl content. It had substantially better dispersibility and faster dissolving rate than the control.

Example 10 (Example 9 control) CMHEC and acetic anhydride 55 grams CMHEC was slurried in 500 ml. 85% acetone containing 1.5 grams sodium hydroxide catalyst. Then 3.75 grams acetic anhydride was added and the reaction allowed to run 10 minutes. The product was washed, steeped and dried.

The product had 1.7% acetyl content. It had good dispersibility whereas the control had poor dispersibility.

TABLE 1.—CMC and CMHEC [1]

[Preparation and Properties of Partially Acylated, Water Soluble CMC]

| Example No. | Reaction Medium | CMC or CMHEC (grams) | Reagents (grams) Anhydride | Reagents (grams) NaOH | Reaction Time (min.) | Washing Medium | Steeping Medium | Percent Acyl Content | Dispersibility | Time to Dissolve (min.) [2] | Brookfield Viscosity (cps.) [3] |
|---|---|---|---|---|---|---|---|---|---|---|---|
| 1 | 70% Acetone | 55 | | | | 70% Acetone | Acetone | None | Poor | [4] 62; 20 | 1,800 |
| 2 | 85% Acetone | 55 | 3.75 | 1.5 | 5 | do | do | 1.2 Acetyl | Good | [4] 33; 3 | 2,000 |
| 3 | 70% Acetone | 55 | 2.5 | 1.5 | 60 | do | do | 0.6 Acetyl | do | | 1,850 |
| 4 | do | 5.5 | 3.75 | 1.5 | 30 | do | do | 0.9 Acetyl | Excellent | [4] 2 | 1,600 |
| 5 | (6) | 5.5 | 0.35 | 0.1 | 5 | do | do | 0.2 Lactyl | Good | Slow [5] | 1,260 |
| 6 | do | | 0.38 | 0.03 | 5 | (7) | do | 1.2 Stearyl | do | | 1,630 |
| 7 | | | | | | | | None | Poor | | 640 |
| 8 | 80% IPA | 55 | 3.75 | 1.5 | 10 | 90% IPA | Acetone | 0.2 Propionyl | Excellent | | 460 |
| 9 | | | | | | | | None | Poor | | 58 (2%) |
| 10 | 85% Acetone | 55 | 3.75 | 1.5 | 10 | 85% Acetone | Acetone | 1.7 Acetyl | Good | | 57 (2%) |

[1] Examples 1–8 were CMC. Examples 9 and 10 were CMHEC.
[2] Time to dissolve 1.5 grams of sample in 300 ml. of water, with mild stirring unless otherwise specified.
[3] 1% aqueous solutions, unless otherwise specified.
[4] Time to dissolve 1 gram of sample in 200 ml. water with high speed stirring.
[5] 120 hours.
[6] Acetone-chloroform-water system (59:15:6 by volume).
[7] Acetone-chloroform-water (59:15:6 by volume); then 70% Acetone.

Example 12 (Example 11 control)
HEC and acetic anhydride 6.8 grams HEC was slurried in 50 ml. acetone containing 0.82 gram sodium acetate cataylst dissolved therein. Then 8.2 grams acetic anhydride was added and the reaction allowed to proceed 5 minutes. The product was washed, steeped and dried.

The product had a 0.2% acetyl content. It had excellent dispersibility whereas the control had only fair dispersibility.

Example 13 (Example 11 control)
HEC and acetic anhydride

Example 12 was substantially repeated except the reaction time was increased from 5 to 90 minutes.

The product had a 6.1% acetyl content. It had excellent dispersibility whereas the control had only fair dispersibility. Foam stability was also greatly increased by the acetylation. Foam head duration was 98 minutes for the product compared to 12 minutes for the control.

Example 15 (Example 14 control)
HEC and acetic anhydride 6.8 grams HEC was slurried in 40 ml. acetic anhydride 5 minutes. Then excess acetic anhydride was removed from the slurry. The wet product, containing 1.8 grams acetic anhydride absorbed on it, was placed in a closed container and left for 60 minutes. Then the product was washed, steeped and dried.

The product had a 1.7% acetyl content. It had excellent dispersibility whereas the control had poor dispersibility.

Example 16 (Example 14 control)
HEC and acetic anhydride 10 grams HEC was slurried 5 minutes in 50 ml. acetic anhydride containing 0.10 gram sodium acetate catalyst dissolved in it. Then excess acetic anhydride was removed from the slurry. The wet product, containing 1.7 grams acetic anhydride-catalyst system absorbed on it, was placed in a closed container and left 60 minutes. Then the product was washed, steeped and dried.

The product had a 4.4% acetyl content. It had excellent dispersibility whereas the control had poor dispersibility.

Example 17 (Example 14 control)
HEC and acetic anhydride 136 grams HEC was slurried 30 minutes in 1000 ml. 90% acetone containing 32.8 grams sodium acetate catalyst dissolved therein. Then 328 grams acetic anhydride was added and the reaction allowed to proceed 60 minutes. The product was washed, steeped and dried.

The product had a 16.2% acetyl content. It had excellent dispersibility whereas the control had poor dispersibility. The foam head duration of the product was greater than 480 minutes while that of the control was only 14 minutes.

Example 19 (Example 18 control)
HEC and acetic anhydride

As compared with Example 14 control, Example 18 control had lower viscosity and poorer dispersibility.

136 grams HEC was slurried 30 minutes in 1000 ml. acetone containing 16.4 grams sodium acetate catalyst dissolved therein. Then 164 grams acetic anhydride was added and the reaction allowed to proceed 90 minutes. The product was washed, steeped and dried.

The product had a 4.0% acetyl content. It had excellent dispersibility whereas the control had poor dispersibility. The product had a foam head duration of 11.5 hours (690 minutes) compared to only 10 minutes for the control.

Example 20 (Example 11 control)
HEC and lactic anhydride 6.8 grams HEC was slurried 5 minutes in 50 ml. of acetone containing 0.375 gram lactic anhydride dissolved in it. The product was washed, steeped and dried.

The product had a 0.3% lactyl content. It had good dispersibility whereas the control had only fair dispersibility.

Example 21 (Example 11 control)
HEC and stearyl anhydride 6.8 grams HEC was slurried in 50 ml. acetone, then 50 ml. of chloroform containing 0.375 gram stearic anhydride was added and the reaction allowed to proceed 5 minutes. The product was washed, steeped and dried.

The product had a 0.6% stearyl content. It has good dispersibility whereas the control had only fair dispersibility.

Example 22 (Example 18 control)
HEC and propionic anhydride 136 grams HEC was slurried 30 minutes in 1000 ml. 95% acetone containing 16.4 grams sodium propionate catalyst dissolved therein. Then 164 grams propionic anhydride was added and the reaction allowed to proceed 90 minutes. The product was washed, steeped and dried.

The product had a 3.8% propionyl content. It had excellent dispersibility whereas the control had poor dispersibility. The foam head duration of the product was about 3.5 hours (335 minutes) as compared to only 10 minutes for the control.

Example 24 (Example 23 control)
HPC and acetic anhydride 10 grams HPC was slurried 5 minutes in 40 ml. acetic anhydride in which was dissolved 2.5 grams sodium acetate catalyst. The product was washed, steeped and dried.

The product had 0.4% acetyl content. It had 41° C. opaque temperature whereas the control had 42° C. opaque temperature. The product had 80 minutes foam head duration compared to only 10 minutes for the control. The product lowered the interfacial tension from 20.0 to 11.4 dynes/cm. whereas the control lowered it from 20.0 to only 11.9 dynes/cm.

Example 25 (Example 23 control)
HPC and acetic anhydride

Example 24 was substantially repeated except the reaction time was increased from 5 to 120 minutes.

The product had 5.6% acetyl content. It had 25.5° C. opaque temperature whereas the control had 42° C. It lowered the interfacial tension from 20.0 to 8.4 dynes/cm., indicating much greater emulsifying power than the control which lowered it to only 11.9 dynes/cm.

Example 26 (Example 23 control)
HPC and acetic anhydride

Example 24 was substantially repeated except the reaction time was increased from 5 to 30 minutes.

The product had 4.0% acetyl content. It had 31.5° C. opaque temperature whereas the control had 42° C. It lowered the interfacial tension from 20 to 9.2 dynes/cm., indicating much better emulsifying power than the control which lowered it to only 11.9 dynes/cm. In addition the product had an 8 hour (480 minutes) foam head duration compared to only 10 minutes for the control.

Example 27 (Example 23 control)
HPC and acetic anhydride 10 grams HPC was slurried in 100 ml. acetone-heptane mixture (1:1 by volume). Then 2.5 grams pyridine catalyst was added dropwise. After 5 minutes stirring, 44 grams acetic anhydride was added and the reaction allowed to proceed 90 minutes. The product was washed, steeped and dried.

TABLE 2.—HEC

[Preparation and Properties of Partially Acylated, Water Soluble HEC]

| Example No. | Reaction Medium | HEC (grams) | Reagents (grams) Anhydride | Reagents (grams) Sodium Acetate | Reaction Time (min.) | Washing Medium | Steeping Medium | Percent Acyl Content | Dispersibility | Foam Head Duration (min.)[1] | Brookfield Viscosity (cps.)[2] |
|---|---|---|---|---|---|---|---|---|---|---|---|
| 11 | Acetone | 6.8 | | | | 90% Acetone | Acetone | None | Fair | 12 | 1,700 |
| 12 | do | 6.8 | 8.2 | 0.82 | 5 | do | do | 0.2 Acetyl | Excellent | | 1,760 |
| 13 | do | 6.8 | 8.2 | 0.82 | 90 | | | 6.1 Acetyl | do | | 1,800 |
| 14 | Acetic Anhydride | 6.8 | | | | Acetone | Acetone | None | Poor | | 1,800 |
| 15 | do | 10 | 3 | | 60 | 90% Acetone | do | 1.7 Acetyl | Excellent | 98 | 1,130 |
| 16 | do | 136 | 1.7 | 32.8 | 60 | (4) | do | 4.4 Acetyl | do | 14 | 940 |
| 17 | 90% Acetone | 136 | 328 | | 60 | | | 16.2 Acetyl | do | >480 | 1,350 |
| 18 | Acetone | 136 | 164 | 16.4 | 90 | (5) | Acetone | None | Poor | 10 | 420 |
| 19 | do | 6.8 | 0.375 | | 5 | Acetone | do | 4.0 Acetyl | Excellent | 690 | 500 (2%) |
| 20 | do | 6.8 | 0.375 | | 5 | (7) | do | 0.3 Lactyl | Good | | 1,750 |
| 21 | (6) | 6.8 | | | | | do | 0.6 Stearyl | do | | 1,800 (2%) |
| 22 | 95% Acetone | 136 | 164 | [8]16.4 | 90 | 90% Acetone | do | 3.8 Propionyl | Excellent | 335 | 328 (2%) |

[1] 50 ml. of 0.1% solution of the sample was placed in a glass-stoppered graduated cylinder and shaken by hand 20 times and let stand. The time at which the clear liquid surface was exposed at the center of the foam head was then recorded.
[2] 1% aqueous solutions, unless otherwise specified.
[3] Amount of reagents absorbed on HEC. In Example 16 1.7 grams is amount of anhydride plus catalyst.
[4] 90% acetone; methanol; methanol-IPA (1:1 by volume); then acetone.
[5] 90% acetone; methanol-IPA (1:1 by volume); then acetone.
[6] Acetone-chloroform (1:1 by volume).
[7] Acetone-chloroform (1:1 by volume); then acetone.
[8] Sodium propionate.

The product had 1.4% acetyl content. It had 37° C. opaque temperature whereas the control had 42° C. It lowered the interfacial tension from 20 to 10.9 dynes/cm., indicating much greater interfacial activity than the control which lowered it to only 11.9 dynes/cm.

The product had 50 minutes foam head duration compared to only 10 minutes for the control.

Example 29 (Example 28 control) MC and acetic anhydride 10 grams MC was slurried 5 minutes in 100 ml. acetone containing 1.2 grams sodium acetate catalyst. 12 grams acetic anhydride was added and the reaction allowed to run 5 minutes. The product was washed, steeped and dried.

The product had a 0.2% acetyl content. The acetylation gave a pronounced increase in foam stability, i.e. from 4 hours for the control to 20 hours. The product had good dispersibility whereas the control had only fair dispersibility. The acetylation did not change the opaque temperature of 55° C.

Example 30 (Example 28 control) MC and acetic anhydride

Example 29 was substantially repeated except the reaction time was increased from 5 to 45 minutes.

The product had a 1.1% acetyl content. The acetylation gave greatly increased foam stability, i.e. from 4 hours to 32 hours. The product had good dispersibility whereas the control had only fair dispersibility. The acetylation lowered the opaque temperature slightly from 55° C. to 53° C.

Example 31 (Example 28 control) MC and acetic anhydride

Example 29 was substantially repeated except the reaction time was increased from 5 to 90 minutes.

The product had a 1.6% acetyl content. Acetylation gave greatly increased foam stability, i.e. from 4 hours to 65 hours. Acetylation reduced the opaque temperature from 55° C. to 34° C. The product had good dispersibility whereas the control had only fair dispersibility.

Example 32 (Example 28 control) MC and acetic anhydride 10 grams MC was wetted with 50 ml. acetic anhydride 5 minutes, then excess acetic anhydride was removed. The wet product, containing 20.5 grams acetic anhydride absorbed on it, was placed in a closed container and left 60 minutes at 25° C. The product was then washed, steeped and dried.

The product had a 0.7% acetyl content. Acetylation gave greatly increased foam stability, i.e. from 4 hours to 47 hours. Acetylation reduced the opaque temperature from 55° C. to 34° C. The product had good dispersibility whereas the control had only fair dispersibility.

Example 33 (Example 28 control) MC and acetic anhydride

Example 32 was substantially repeated except 0.10 gram sodium acetate catalyst was added to the acetic anhydride. The wet product, containing 22 grams acetic anhydride-catalyst system absorbed on it, was placed in a closed container 60 minutes at 25° C. The product was washed, steeped and dried.

The product had 2.9% acetyl content. Acetylation gave greatly increased foam stability, i.e from 4 hours to 156 hours. Acetylation decreased the opaque temperature from 55° C. to 34° C. The product had excellent dispersibility whereas the control had only fair dispersibility.

Example 35 (Example 34 control) MHPC and acetic anhydride 18.6 grams MHPC was slurried 5 minutes in 200 ml. acetone containing 3.28 grams sodium acetate catalyst. 32.8 grams acetic anhydride was added and the reaction

TABLE 3.—HPC

[Preparation and Properties of Partially Acylated, Water Soluble HPC]

| Example No | Reaction Medium | HPC (grams) | Reagents (grams) | | | Reaction Time (min.) | Washing Medium | Steeping Medium | Percent Acetyl Content | Opaque Temp. (°C.) | Interfacial Tension (dynes/cm.)[1] | Foam Head Duration (min.)[2] | Brookfield 1% Viscosity (cps.) |
|---|---|---|---|---|---|---|---|---|---|---|---|---|---|
| | | | Anhydride | Sodium Acetate | Pyridine | | | | | | | | |
| 23 | Acetic Anhydride | 10 | | | | | | | None | 42 | 11.9 | 10 | 1,500 |
| 24 | do | 10 | 44 | 2.5 | | 5 | (3) | (4) | 0.4 | 41 | 11.4 | 80 | 1,400 |
| 25 | do | 200 | 44 | 2.5 | | 120 | (3) | (4) | 5.6 | 25.5 | 8.4 | | 1,300 |
| 26 | do | 10 | 1,650 | 50 | | 30 | (5) | (6) | 4.0 | 31.5 | 9.2 | >480 | 1,350 |
| 27 | do | | 44 | | 2.5 | 90 | (3) | (6) | 1.4 | 37 | 10.9 | 50 | 1,600 |

[1] Interfacial tension in system containing squalane and a 0.01% aqueous solution of the sample; tension at the squalane, distilled water interface was 20.0 dynes/cm. Squalane is a saturated hydrocarbon having the formula $C_{30}H_{62}$.
[2] 50 ml of 0.1% solution of the sample was placed in a glass-stoppered graduated cylinder and shaken by hand 20 times and let stand. The time at which the clear liquid surface was exposed at the center of the foam head was then recorded.
[3] Acetone-heptane-water (25:10:1 by volume); then acetone-heptane (1:1 by volume).
[4] Heptane.
[5] Hot water.
[6] Acetone-heptane (1:1 by volume).

allowed to run 90 minutes. The product was washed, steeped and dried.

The product had 3.2% acetyl content. It had 60 minutes foam head duration and excellent dispersibility whereas the control had a foam head duration of only 30 minutes and only fair dispersibility.

From the foregoing examples it will be seen that acylation of water soluble cellulose ethers in accordance with the present invention substantially improves one or more of the properties of dispersibility, dissolving rate, interfacial activity, and foam stability, and this is accomplished without substantially changing the viscosity properties. It will be noted from Examples 23-33 that acylating of hydroxypropyl cellulose and methyl cellulose in accordance with the present invention lowered their opaque temperature. Acylated hydroxypropyl cellulose and methyl cellulose having these reduced opaque temperatures may be employed to advantage in those uses in which it is necessary or desirable for the acylated product to be soluble in the system involved but capable of being rendered insoluble therein merely by slightly raising the temperature of the system. One example of this is use of the acylated product as a thickener where it is desirable to have low viscosity during preparation to facilitate mixing at elevated temperature and to have high viscosity after mixing and cooling, e.g. in puddings. Another example of this is use of the acylated product in warp sizing where it is deposited on the warp at an elevated temperature and washed off at a reduced temperature.

The present invention is applicable to water soluble cellulose ethers in general. It is particularly applicable to water soluble cellulose ethers such as, e.g., carboxyalkyl cellulose (e.g. carboxymethylcellulose), hydroxyethyl cellulose, hydroxypropyl cellulose, methyl cellulose, methyl hydroxyalkyl cellulose (e.g. methyl hydroxypropyl cellulose) and carbonxyalkyl hydroxyethyl cellulose (e.g. carboxymethyl hydroxyethyl cellulose).

Although acylation temperature and time are not critical, they are pertinent to the invention as those skilled in the art will appreciate. As would be expected, the degree of acylation varies directly with the time and temperature of the reaction. Although the acylation proceeds satisfactorily at room temperature, temperatures on the order of about 0° C. to about 40° C., and even higher are applicable. For instance, in nonaqueous systems the acylation can be carried out quite practically up to the reflux temperature of the reaction mixture. However, with aqueous systems the higher the temperature the greater the tendency is for the acylating agent to be hydrolyzed at the expense of reduced acylation of the water soluble cellulose ether.

As will be seen from the foregoing examples, the degree of acylation may vary widely. A very small degree of acylation gives substantial improvements. The upper degree of acylation is that beyond which the product no longer remains substantially soluble in water. The acylating agent employed has a definite bearing on the range in degree of acylation, typical acylating agents and ranges within which satisfactory results are obtained being as follows:

| Acylating agent: | Percent acyl content |
|---|---|
| Acetic anhydride | 0.1-18 |
| Propionyl anhydride | 0.2-10 |
| Lactyl anhydride | 0.2-2 |
| Stearyl anhydride | 0.2-1.5 |

Typical acylating agents include, e.g., the anhydrides of monobasic acids and the corresponding acyl halides.

The foregoing disclosure regarding degree of acylation and acylating agents is given by way of illustration and not limitation.

Although the use of an acylation catalyst (as will be seen from the foregoing examples) is not necessary, it may be deemed desirable. From the examples it will

TABLE 4.—MC AND MHPC [1]

[Preparation and properties of partially acylated MC and MHPC]

| Example No. | Reaction Medium | MC or MHPC (grams) | Reagents (grams) Anhydride | Reagents (grams) Sodium Acetate | Reaction Time (Min.) | Washing Medium | Steeping Medium | Percent Acetyl Content | Dispersibility | Opaque Temp. (°C.) | Foam Head Duration (hrs.) [2] | Brookfield 1% Viscosity (cps.) |
|---|---|---|---|---|---|---|---|---|---|---|---|---|
| 28 | Acetone | 10 | | | | 90% Acetone | Acetone | None | Fair | 55 | 4 | 300 |
| 29 | do | 10 | 12 | 12 | 5 | do | do | 0.2 | Good | 55 | 20 | 270 |
| 30 | do | 10 | 12 | 12 | 45 | do | do | 1.1 | do | 55 | 32 | 280 |
| 31 | do | 10 | 12 | 12 | 90 | do | do | 1.6 | do | 34 | 65 | 120 |
| 32 | Acetic Anhydride | 10 | [3] 20.5 | | 60 | do | do | 0.7 | do | 34 | 47 | 380 |
| 33 | do | 10 | [3] 22 | | 60 | do | do | 2.9 | Excellent | 34 | 156 | 10 |
| 34 | | 18.6 | 180 | 18 | 90 | [4] | | None | Fair | | 0.5 | 40 |
| 35 | Acetone | | | | | | Acetone | 3.2 | Excellent | | 1.0 | 24 |

[1] Examples 28-33 were MC. Examples 34 and 35 were MHPC.
[2] 50 ml. of 0.1% solution of the sample was placed in a glass-stoppered graduated cylinder and shaken by hand 20 times and let stand. The time at which the clear liquid surface was exposed at the center of the foam head was then recorded.
[3] Amount of reagents absorbed on MC. In Example 33, 22 grams is amount of anhydride plus catalyst.
[4] 90% acetone; methanol; methanol-IPA (1:1 by volume); then acetone.

be seen that the use of a catalyst gave the usual result of accelerating the acylation reaction.

In any event, the acylation conditions must be such that the product is substantially soluble in water. Of course, one will also avoid using acylation conditions (e.g., such as elevated temperature and extended time of acylation) which might be harmful to the reaction mixture or the product. For instance, those skilled in the art will know to avoid using such an elevated temperature of acylation which might degrade the cellulose ether or the acylated product.

What we claim and desire to protect by Letters Patent is:

1. Process of preparing water soluble ether-esters of cellulose having improved properties which comprises acylating a water soluble cellulose ether in the presence of a nonsolvent reaction medium, continuing said acylation until said product being produced has an acyl content of about 0.1%–18%.

2. Process of claim 1 wherein the water soluble cellulose ether is selected from the group consisting of carboxyalkyl cellulose, hydroxyethyl cellulose, hydroxypropyl cellulose, methyl cellulose, methyl hydroxyalkyl cellulose, and carboxyalkyl hydroxyethyl cellulose.

3. Process of claim 1 wherein the water soluble cellulose ether is selected from the group consisting of carboxymethylcellulose, methyl hydroxypropyl cellulose, and carboxymethyl hydroxyethyl cellulose.

4. The water soluble ether-esters products resulting from carrying out the process set forth in claim 1.

References Cited

UNITED STATES PATENTS

| | | | |
|---|---|---|---|
| 2,748,111 | 5/1956 | Grassie et al. | 260—226 |
| 2,330,263 | 9/1943 | Broderick | 260—226 |
| 2,327,397 | 8/1943 | Broderick | 260—226 |
| 2,055,892 | 9/1936 | Dreyfus | 260—226 |
| 1,994,038 | 3/1935 | Hagedorn et al. | 260—226 |

DONALD E. GZAJA, *Primary Examiner.*

R. W. MULCAHY, *Assistant Examiner.*

UNITED STATES PATENT OFFICE

CERTIFICATE OF CORRECTION

Patent No. 3,435,027                                           March 25, 1969

Armand J. Desmarais et al.

It is certified that error appears in the above identified patent and that said Letters Patent are hereby corrected as shown below:

Column 2, line 45, "disperibility" should read -- dispersibility --. Column 3, line 30, "couplete" should read -- complete --. Column 10, TABLE 3, Footnote No. 1, line 2 thereof, "$C_{30}H_{62}$" should read -- $C_{30}H_{26}$ --. Column 11, line 36, "carbonxyalkyl" should read -- carboxyalkyl --.

Signed and sealed this 31st day of March 1970.

(SEAL)
Attest:

Edward M. Fletcher, Jr.                              WILLIAM E. SCHUYLER, JR.
Attesting Officer                                             Commissioner of Patents